April 29, 1958     E. G. MATKINS ET AL     2,832,914
CONDITION RESPONSIVE CONTROL CIRCUIT
Filed Jan. 5, 1956
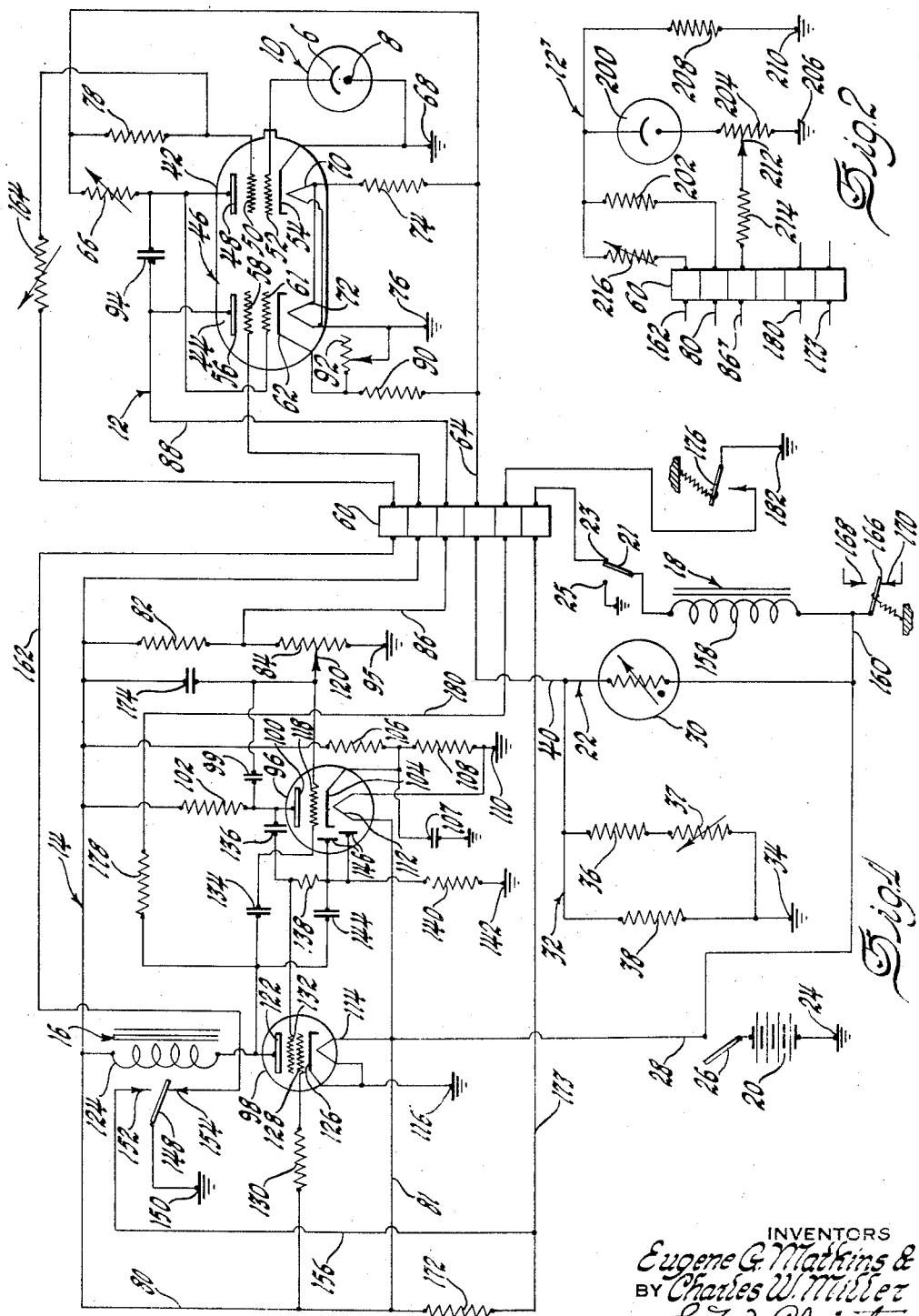
INVENTORS
Eugene G. Matkins &
BY Charles W. Miller
E. W. Christen
ATTORNEY United States Patent Office 2,832,914
Patented Apr. 29, 1958

2,832,914

CONDITION RESPONSIVE CONTROL CIRCUIT

Eugene G. Matkins and Charles W. Miller, Anderson, Ind., assignors to General Motors Corporation, Detroit, Mich., a corporation of Delaware Application January 5, 1956, Serial No. 557,582

10 Claims. (Cl. 315—83)

This invention relates to condition responsive control circuits and more particularly to such circuits which are adapted to effect or initiate a control operation upon the occurrence of a predetermined value of a condition such as illumination.

The invention is especially adapted for use in automatic control systems for automotive vehicle headlamps. The present-day conventional headlamp system utilizes lamps having means adapted to project light beams of different directivity and intensity which may be selectively energized in accordance with driving conditions. The common practice is to provide an upper or bright beam for open highway driving and a lower or dim beam for city driving and for passing an oncoming vehicle. Other systems have been devised for regulating the headlamps in a manner to avoid blinding the operator of an oncoming vehicle while affording adequate roadway illumination. Whatever the particular system, it is required to effect some control operation, such as switching, to regulate the headlamps in accordance with the operating conditions.

The desirability of automatically controlling the headlamp system in accordance with the condition of incident light intensity resulting from oncoming traffic has long been recognized. Such automatic headlamp control has now attained widespread acceptance and usage and contributes substantially to safer and improved vehicle operation. In order to promote the use of automatic headlamp control, the desirability of a low cost system is apparent. It is imperative, however, that the system be capable of positive and accurate response and it must be completely reliable in operation. The system should require a minimum of maintenance and should be of relatively simple design to facilitate servicing.

Accordingly, it is an object of this invention to provide an improved condition responsive control circuit which affords positive and accurate operation with fast response to the occurrence of a predetermined value of the condition.

A further object of this invention is to provide a condition responsive control circuit which is reliable in operation and of simple, inexpensive construction.

An additional object of the invention is to provide an automatic headlamp control system which may be energized from a low voltage direct current source such as the storage battery of the conventional automotive vehicle.

A further object of the invention is to provide an improved condition sensing circuit for developing a signal voltage upon the occurrence of a predetermined value of a condition.

An additional object of the invention is to provide an improved control circuit for a vehicle headlamp system which is instantly responsive to the application of a control signal impulse to perform a switching operation.

In the accomplishment of these objects, circuit means are provided for developing a signal voltage from a condition responsive device, such as a photocell, when the condition has reached a predetermined value. An oscillator is responsive to the application of the signal voltage to develop an oscillatory current in an output circuit thereof which includes a control relay. Circuit means are provided for influencing the current flow in the oscillator output circuit in response to the initiation of oscillations for actuating the control relay.

A more complete understanding of the invention may be had from the detailed description which follows taken with the accompanying drawings in which:

Figure 1 is a circuit diagram of the inventive system; and

Figure 2 is a modification of the condition sensing circuit which may be used with the system of Figure 1.

Referring now to the drawings, there is shown an illustrative embodiment of the invention in a system for automatically controlling the headlamps of an automotive vehicle in accordance with incident light or illumination. Briefly, the system comprises a condition responsive element or photocell 10 which is adapted to control the output of a signal voltage developing circuit, designated generally at 12, which is connected with a control oscillator, designated generally at 14, and is adapted to initiate and terminate oscillations therein. A control relay 16 is responsive to current in an output circuit of the oscillator 14 and is adapted to control the energization of a power relay 18 which effects a switching operation of the headlamp filament circuits. A portion of the system is energized directly from a low voltage direct current source or battery 20 and a portion is energized indirectly therefrom through a voltage regulator, designated generally at 22.

The photocell 10 and signal voltage developing circuit 12 may be considered the sensing or pick-up unit of the system and are suitably located on the vehicle so that the photocell is exposed to light rays projected from the headlamps of an oncoming vehicle. The pick-up unit may be suitably installed in a single housing and is desirably mounted behind the windshield of the vehicle on the instrument panel. The oscillator circuit 14 and relays 16 and 18 may be considered the control unit of the system. The control unit and the voltage regulator may be mounted in a single housing and installed in any convenient location on the vehicle, such as within the engine compartment or under the instrument panel.

At this point in the description it will be helpful to consider the power supply for energizing the sensing and control circuits. The battery 20 has the negative terminal connected to a point of reference potential or ground 24 and the positive terminal is connected through a switch 26, such as a manually operable headlamp switch, to an unregulated supply voltage conductor 28. The voltage regulator 22 comprises a voltage divider including a ballast tube 30 and resistance network 32 connected across the conductor 28 and ground 34. The resistance network 32 includes the series combination of fixed resistor 36 and variable resistor 37 connected in parallel with fixed resistor 38. A substantially constant, regulated voltage is derived from the junction of the ballast tube 30 and resistance network by conductor 40 and is applied to a regulated supply voltage conductor 64 through junction block 60. The desired value of regulated voltage on the supply conductor 64 may be obtained by adjustment of either the ballast tube 30 or the variable resistor 37.

The photocell 10, suitably of the photo-conductive type, is provided with a cathode 6 and an anode 8. The photocell is connected with the signal voltage developing circuit 12 to control the energization thereof in a manner to be described presently. The signal voltage developing circuit 12 includes a pair of amplifying devices or electron tubes 42 and 44 which are preferably constructed with electrodes contained within a single envelope 46. The electron tube 42 is provided with supply voltage on the plate electrode 48 from the regulated voltage supply conductor 64 through the plate circuit variable resistor 66. The cathode electrode 54 is returned directly to ground 68. The cathode heater filaments 70 and 72 of the electron tubes are energized in parallel from the conductor 64 through the current limiting resistor 74 to ground 76. The tube 42 is provided with a bias voltage on control electrode 50 by connection thereof through resistor 78 to conductor 64. A control voltage on the control electrode 52 is developed by the action of the photocell 10. The photocel cathode 6 is connected to the control electrode 52 and the photocell anode 8 is connected to the cathode 54. Since the photocell 10 is of the photo-conductive type, its resistance varies with the amount of light impinging thereon and thus constitutes a variable resistance in the grid to cathode circuit of the electron tube 42. The resistance of the photo-conductive cell 10 is of high value in the absence of light and decreases with increase of the incident light and the cell may be considered to function as a variable grid-leak resistance. The supply voltage and bias conditions on the tube 42 are such that, in the absence of light on photocell 10, the tube is non-conductive. The control electrode 52 accumulates a negative charge from electron emission in the tube and in the absence of light on the photocell 10, a negative bias voltage is developed on the control electrode 52 sufficient to maintain the tube in a cut-off or non-conductive condition. Upon the incidence of a predetermined value of light intensity, the photocell resistance decreases sufficiently to permit the negative charge to leak off and the bias voltage on control electrode 52 becomes sufficiently less negative to permit conduction through the tube 42.

The electron tube 44 is provided with a supply voltage on plate electrode 56 which is derived from the unregulated voltage supply conductor 28 through conductors 80 and 81, and voltage divider resistors 82 and 84. The plate voltage is taken from the junction of the voltage divider resistors and applied through conductor 86, junction block 60, and conductor 88. The cathode electrode 62 is maintained at a predetermined value above ground potential by connection to the junction of voltage divider resistors 90 and 92 which are energized from the regulated voltage supply conductor 64. The voltage divider resistor 92 is preferably a variable resistor having its adjustable tap connected to ground 76 permitting adjustment of the potential of cathode electrode 62. The electron tube 44 is provided with a bias voltage on control electrode 58 by connection thereof through junction block 60 and conductors 80 and 81 to the unregulated voltage supply conductor 28. A control voltage for the tube 44 is derived from the plate circuit of the tube 42 by connection of the control electrode 61 directly to the plate electrode 48. The supply and bias voltage conditions maintained on the electrodes of the tube 44 are such that it is conductive when tube 42 is non-conductive. Since the tube 42 is normally non-conductive, the plate voltage thereof which is applied to the control electrode 61 is normally of a relatively high value and serves to maintain a normal state of conduction through the tube 44.

It is noted that the supply voltage for the plate electrode 48 of the electron tube 42 is derived from the regulated supply voltage conductor 64 whereas the supply voltage for plate electrode 56 of tube 44 is derived from the unregulated supply voltage conductor 28. It is desirable, of course, to utilize a regulated supply voltage to enhance the accuracy and stability of the operation of the system but voltage regulation necessarily involves a decrease of voltage and power. The advantages of the regulated supply are realized in the operation of the tube 42 whereas the advantages of the higher value of the unregulated voltage are realized in tube 44. In order to prevent voltage fluctuation of the unregulated supply from disturbing the relationship between the control voltage cut-off values for the tubes 42 and 44, the bias voltage on control electrode 58 is taken from the unregulated voltage supply conductor 80 to compensate the tube 44 for voltage fluctuations. Additionally, a condenser 94 is connected between the plate electrodes 48 and 56 of the two tubes which tends to maintain the voltage difference between the plate electrodes at a constant value during transient voltage variations.

The signal voltage output from the electron tube 44 is developed across the resistor 84 which has one terminal connected to plate electrode 56 through conductors 86 and 88 and the other terminal connected to ground 95. It is noted that the conductive path through tube 44 is connected in parallel with the resistor 84, the latter forming a voltage divider with resistor 82 between the supply voltage conductor 80 and ground 95. Therefore, variation of the conductivity of the tube 44 is effective to develop a varying signal voltage output across the resistor 84. This varying signal voltage output is applied as the signal voltage input to the oscillator, designated generally at 14.

The oscillator 14 preferably takes the form of a conventional multivibrator of the free running type. It comprises a pair of amplifying devices or electron tubes 96 and 98 each of which is provided with plural electrodes. The electron tubes 96 and 98 are suitably cross-connected from plate to control electrodes by time constant circuits to develop continuous or free running oscillations. The electron tube 96 is provided with a supply voltage on the plate electrode 100 from the unregulated voltage supply conductor 80 through the plate circuit resistor 102. The cathode electrode 104 is maintained at a potential above ground by connection thereof to the junction of voltage divider resistors 106 and 108 which are serially connected between supply voltage conductor 80 and ground 110. The cathode heater filaments 112 and 114 are energized by connection between voltage supply conductor 28 and ground 110 and 116, respectively. A control voltage is applied to the control electrode 118 by connection thereof to the resistor 84 through an adjustable tap 120. The bias voltage developed across resistor 108, which is applied between cathode 104 and control electrode 118, is sufficiently negative to maintain the tube 96 non-conductive in the absence of a signal voltage upon control electrode 118. This is the normal condition in the absence of light on the photocell 10.

The electron tube 98 is provided with supply voltage on plate electrode 122 from the unregulated voltage supply conductor 80 through the energizing coil 124 of the control relay 16. The cathode electrode 126 is connected directly to ground 116. A bias voltage is applied to the control electrode 128 from the supply voltage conductor 80 through the resistor 130. A control voltage is applied to the control electrode 132 which is derived from the plate electrode 100 of tube 96 in a manner to be described presently. The supply and bias voltage conditions on the tube 98 are such that in the absence of a negative control voltage of predetermined value on the control electrode 132, the tube is conductive. Thus the energizing coil 124 of the control relay 16 is normally energized.

The electron tubes 96 and 98 are cross-connected by time constant circuits in multivibrator configuration to provide for the generation of oscillating current in the tubes. The control electrode 118 of the tube 96 is coupled with plate electrode 122 of tube 98 through condenser 134 and is connecetd through a portion of resistor 84 to ground 95. The control electrode 132 of tube 98 is coupled to the plate electrode 100 of tube 96 through a condenser 136 and is connected through resistor 138 and resistor 140 to ground 142. The multivibrator circuit just described is preferably of the unbalanced or asymmetrical type and therefore circuits which interconnect the plate and control electrodes of the two tubes have different time constants. The time constant circuit comprising condenser 136 and resistors 138 and 140 is effective to determine the conductive interval of the tube 98 and the time constant circuit comprising condenser 134 and the portion of resistor 84 is effective to determine the conductive interval of the tube 96 in a manner well known in the art. The time constant of the circuit including condenser 136 and resistors 138 and 140 and hence the conductive interval of tube 98 is preferably larger than that of tube 96 by a factor of the order of ten. A condenser 99 may be connected between plate electrode 100 and control electrode 118 to provide a feedback path to obtain frequency stability and to prevent erratic operation in control of the oscillator.

In order to develop a control voltage on the control electrode 132 of electron tube 98 in response to oscillations in the multivibrator circuit, circuit means are interposed between the plate electrode 122 and the control electrode 132. This circuit means preferably takes the form of a D. C. restorer or clamping circuit of the type which develops a negative voltage with respect to a predetermined reference voltage value. This circuit, which will be referred to herein as a negative clamping circuit, comprises a condenser 144 connected between the plate electrode 122 and diode plate electrodes 146 in a diode section of the envelope of electron tube 96. The cathode electrode 104 serves to complete the diode section and as previously mentioned is connected through the voltage divider resistor 108 to ground 110. It will be apparent that a diode separate from the electron tube 96 may be utilized if desired. The negative clamping circuit is completed by connection of the diode plate electrodes 146 through resistor 140 to ground 142. When the multivibrator is in a state of oscillation, positive pulses appear on the plate electrode 122 which are applied across the series combination of the condenser 144, the diode electrodes 146 and 104, and resistor 108 to ground 110. This circuit has a relatively low time constant and the condenser is rapidly charged to the peak value of the voltage on plate electrode 122 above the reference voltage value appearing across resistor 108. During the interval between positive pulses, the condenser 144 tends to discharge through a relatively large time constant circuit including the resistor 140, and the repetitive positive pulses from the plate electrode 122 are effective to maintain the condenser charged to substantially peak value. The control voltage, taken from the negative terminal of condenser 144, is applied through isolating resistor 138 to the control electrode 132 and operates to reduce the conduction through the tube 98 to effectively de-energize the control relay winding 124.

Control relay 16, which is actuated by energizing winding 124, is provided with a movable contact 148 connected to ground 150. The contact 148 is movable between a pair of spaced fixed contacts 152 and 154 and is suitably spring biased toward engagement with the fixed contact 152. The fixed contact 152 is connected through conductors 156 and 173, junction block 60, and manual switch 21 to one terminal of the energizing coil 158 of the power relay 18. The other terminal of the energizing coil 158 is connected by conductor 160 to the supply voltage conductor 28. Therefore, when the control relay winding 124 is de-energized the movable contact 148 engages the fixed contact 152 under the influence of the spring bias and an energizing circuit for the power relay coil 158 is completed from the supply voltage conductor 28 to ground 150. When the control relay coil 124 is energized, causing the movable contact 148 to engage the fixed contact 154, a circuit is completed from ground 150 through conductor 162, junction block 60, and variable resistor 164 to the control electrode 50 in the electron tube 42. This circuit is effective to change the bias voltage conditions of the electron tube 42 by connection of the variable resistor 164 and fixed resistor 78 in voltage divider arrangement across the supply voltage conductor 64 and ground 150 with the control electrode 50 connected to the junction of the resistors. This change of bias voltage on control electrode 50 is effective to change the sensitivity of the system in a manner described hereinafter.

The power relay 18, which is actuated by energizing coil 158 in accordance with the condition of the control relay 16, is provided with movable contact 166 connected to supply voltage conductor 28 through conductor 160. The contact 166 is movable between a pair of spaced fixed contacts 168 and 170 and is normally spring-urged into engagement with the fixed contact 170. The fixed contact 170 is connected electrically in the circuit of the upper beam filaments of the headlamp system (not shown) and the fixed contact 168 is connected in circuit with the lower beam filaments. The movable contact 166 is adapted to selectively energize the upper and lower beam headlamp filaments from supply voltage conductor 28 in accordance with the condition of the power relay.

In order to protect the control relay contacts 152 and 148 upon interruption of the inductive energizing circuit of the power relay coil 158, a resistor 172 is connected across the terminals of the coil. One terminal of the resistor 172 is connected through conductor 173, junction block 60, and switch 21 to the upper terminal of coil 158 and the other terminal of the resistor is connected through conductors 81, 28, and 160 to the lower terminal of the coil.

Since the electron tubes 98, 96, and 44 are energized from the unregulated supply voltage conductor 80, it is desirable to provide circuit means for minimizing the effect of fluctuations of the supply voltage from battery 20. A condenser 174 is connected from the supply voltage conductor 80 to the control electrode 118. The condenser 174 serves as a low impedance path, for supply voltage transients, to the control electrode 118. Such transients are applied to electrodes 100 and 118 in phase which tends to nullify the effect on oscillator action. Additionally, a filter condenser 107 may be connected across resistor 108 to ground to prevent line surges from affecting operation of the oscillator.

Manual control of the system is provided by a manual override switch 176 which is connected in the circuit extending from plate electrode 122 through resistor 178, conductor 180, and junction block 60 to ground 182. The movable contact of the override switch 176 is spring-urged to the open position. When the switch is closed by manual operation, the energizing coil 124 of control relay 16 is connected directly between supply voltage conductor 80 and ground 182 causing energization thereof. As a result, the power relay winding 158 is de-energized and the movable contact 166 thereof engages fixed contact 170 and energizes the upper beam filaments of the headlamp system regardless of the condition of the automatic control circuits.

Additional manual control is provided by switch 21 which is suitably of the ratchet type adapted for operation by the foot of the operator. Switch 21 is movable between fixed contacts 23 and 25 for selection of automatic headlamp control or manual energization of the low beam circuits. With the switch 21 in engagement with contact 23, the energization of the power relay winding 158 is controlled by the control relay 16 as previously described. With the switch 21 in engagement with contact 25, which is connected to ground, the power relay winding is energized directly from battery 20 through an obvious circuit. Thus the movable contact 166 engages fixed contact 168 to energize the lower beam filaments of the headlamp system.

The operation of the automatic control system will be described by first considering the condition of the circuits when photocell 10 is in a dark condition or the light impinging thereon is less than a predetermined value. The system is energized with supply voltage by closure of the manual switch 26 and automatic control is selected by engagement of switch 21 with contact 23. In this condition the voltage appearing on the control electrode 52 of electron tube 42 is sufficiently negative to prevent conduction through the tube. As a result, the voltage appearing on plate electrode 48 is of relatively high positive value and this voltage is applied to the control electrode 61 of the electron tube 44. Consequently, the tube 44 is rendered conductive and serves as a shunt path around voltage divider resistor 84. The control voltage for the oscillator 14, derived from the adjustable tap 120, is not sufficiently positive to cause conduction in the tube 96. The position of tap 120 is adjustable to permit the initial selection of the predetermined value of illumination required to cause switching of the headlamps. As previously described, the supply and bias voltage conditions in the oscillator 14 are such that the electron tube 96 is non-conductive and the electron tube 98 is conductive. Conduction through tube 98 energizes the control relay winding 124 and the movable contact 148 is held in engagement with the fixed contact 154. This condition of the control relay completes the bias voltage circuit extending from supply voltage conductor 64 through fixed resistor 78 and variable resistor 164 to ground 150. The bias voltage on control electrode 50 is derived from the junction of resistors 78 and 164 and is also operative to establish the predetermined value of illumination required to initiate conduction in the electron tube 42 and cause switching of the headlamps. This bias condition, which determines the sensitivity of the system, is adjustable by setting of the variable resistor 164 and is usually termed the dim sensitivity since it regulates the value of illumination required to cause the system to automatically switch the headlamps to the dim or lower beam filaments.

With the control relay 16 in the condition just described, the fixed contact 152 thereof presents an open circuit to one terminal of the power relay winding 158. Power relay 18 is accordingly de-energized and the movable contact 166 is in engagement with the fixed contact 170. As a result, an energizing circuit for the upper beam filaments of the headlamp system is completed from the voltage supply conductor 28 through conductor 160 to fixed contact 170.

Upon the occurrence of illumination greater than the aforementioned predetermined value, the photocell 10 permits the control electrode 52 to become sufficiently less negative to initiate conduction in the electron tube 42. This conduction causes the voltage of plate electrode 48 to decrease and the voltage applied to control electrode 61 of electron tube 44 is correspondingly decreased. The control voltage on electrode 61 renders the tube 44 less conductive and the signal voltage output developed across resistor 84 is increased. The increase of signal voltage derived from adjustable tap 120 is applied to the control electrode 118 of the electron tube 96. Conduction in the tube 96 is initiated and accordingly the voltage on plate electrode 100 decreases. This negative-going voltage appears across resistors 138 and 140 and is applied to control electrode 132 of electron tube 98 causing a reduction of current flow therein. This causes the voltage of plate 122 to increase and this positive-going voltage appears across resistor 84 and is applied to control electrode 118 causing the current conduction of tube 96 to increase further. These effects are cumulative and operate substantially instantaneously to render the tube 96 conductive and to reduce current conduction through tube 98. This condition, however, is not stable because the previously charged coupling condenser 136 discharges at a rate determined by the time constant of its circuit and the voltage on control electrode 132 increases positively. When the cut-off value of voltage is exceeded, conduction through tube 98 is restored and conduction in tube 96 is cut-off in the manner previously described with respect to tube 98. This action of alternate conduction through the tubes 96 and 98 is repetitive at a rate determined by the circuit parameters and produces continuous or free-running oscillations in the oscillator 14.

A control voltage for regulating the current conduction through the electron tube 98 is derived from its plate electrode 122 in response to oscillations therein and is applied by the negative clamping circuit, previously described, to the control electrode 132. This control voltage, developed across resistor 140 and applied through resistor 138, is sufficiently negative to reduce the current conduction of tube 98 an amount which effectively deenergizes the control relay winding 124. As a result, movable contact 148 engages fixed contact 152 and connects the upper terminal of the power relay winding 158 through conductors 173 and 156 to ground 150. The energizing path for relay winding 158 is thereby completed from the supply voltage conductor 28 through conductor 160 to ground 150. Consequently, the movable contact 166 is displaced into engagement with the fixed contact 168 to energize the lower beam filaments of the headlamp system.

With the control circuit in this condition, the control relay contacts 148 and 154 are interrupted and sensitivity control resistor 164 is effectively removed from the bias voltage circuit of control electrode 50 in electron tube 42. This change in the bias circuit increases the positive voltage applied to control electrode 50 from the supply voltage conductor 64 through resistor 78. This increase of bias voltage on control electrode 50 tends to increase the current conduction through amplifying device 42 for a given value of illumination. As a result, a lower value of illumination is required to cause the system to maintain or hold the lower beam filaments in energized condition than was required to cause the system to energize the lower beam filaments. This provision for a differential of operation is desirable to prevent the system, in its response to the light projected from an oncoming vehicle, from returning the headlamps to the upper beam filaments upon the occurrence of decreased illumination which results from the responsive manual or automatic dimming of the headlamps of the oncoming vehicle. The lower value of illumination at which the multivibrator 14 ceases oscillation to cause the system to return the headlamps to the upper beam is adjustably selected by the position of tap 120. This adjustment is termed the hold sensitivity of the system.

When the illumination falls below the value established by the hold sensitivity adjustment of tap 120, the photocell 10 operates to increase the negative bias on control electrode 52 and the electron tube 42 is rendered less conductive. As a result, the plate voltage thereof is increased and a correspondingly increased voltage is applied to the control electrode 61 of electron tube 44. The tube 44 becomes more conductive and the voltage on its plate electrode 56 decreases causing a decreased value of signal voltage appearing across resistor 84. This decreased signal voltage is applied to control electrode 118 of tube 96 and the conduction thereof is terminated. The normal bias conditions in the oscillator circuit are restored and the tube 98 becomes conductive, energizing the control relay winding 124. The movable contact 148 is displaced from fixed contact 152 and the power relay winding 158 is de-energized. As a result, the movable contact 166 is displaced into engagement with the fixed contact 170 and the upper beam filaments of the headlamp system are energized.

In Figure 2 there is illustrated an additional embodiment of one portion of the system which corresponds in function to the signal voltage developing circuit of Figure 1. This circuit, designated generally at 12', lends the advantage of being operative from a low voltage direct current source without the necessity of voltage regulation. Additionally, it provides a signal voltage suitable for application directly to the oscillator 14 without an intermediate stage of amplification. The signal voltage developing circuit 12' comprises a photocell 200 of the type known as a broad area photo-conductive cell and may be of the type currently known in the trade by the designation C-7218, manufactured by the Radio Corporation of America. This cell is designed to operate on 5 to 8 volts and has a dark current of less than one-tenth microampere. The energizing circuit for the photocell 200 extends from the voltage supply conductor 80 through the junction block 60 to voltage dropping resistor 202, and thence through serially connected cell 200 and signal voltage developing resistor 204 to ground 206. A fixed resistor 208 is connected in parallel with the photocell 200 and resistor 204 from the upper terminal of the photocell to ground 210. The signal voltage is derived from the resistor 204 by the movable tap 212 and is applied through resistor 214, junction block 60 to conductor 86' and thence directly to the control electrode 118 of the electron tube 96. A variable resistor 216 is connected from the junction point of resistor 202 and photocell 200 to conductor 162 to provide for dim sensitivity adjustment. It is noted that the voltage regulator 22 and its associated supply voltage conductor 64 are eliminated in this embodiment but that the remainder of the circuit may be the same as in Figure 1.

In operation of the signal voltage developing circuit 12', the photocell 200 is operative to present a very high resistance in the absence of light and conductivity increases with an increase of illumination permitting the current flow therethrough to develop a signal voltage across the resistor 204. A selected portion of this voltage is derived by the movable tap 212 for application to the control electrode 118 of tube 96 in multivibrator 14. When the illumination increases to a predetermined value, which may be selectively established by adjustment of the dim sensitivity resistor 216, the signal voltage applied to control electrode 118 will be sufficiently positive to cause conduction in tube 96. Thus, oscillations are initiated in the multivibrator 14 and control relay 16 is de-energized as previously described. Consequently, the power relay 18 is energized and the lower beam filaments of the headlamp system are energized. The actuation of control relay 16 displaces the movable contact 148 from the fixed contact 154 and the dim sensitivity resistor 216 is disconnected from ground 150. As a result, the voltage applied across the photocell 200 is increased causing an increased current conduction for a given value of illumination. Therefore, the signal voltage derived by tap 212 on resistor 204 will remain sufficiently positive to maintain oscillations in multivibrator 14 until the illumination value is decreased to a lower predetermined value. This lower predetermined value may be selectively established by adjusting the position of the movable tap 212. This adjustment determines the lower value of illumination which is effective to cause the system to hold the lower beam filaments energized and is termed to hold control of the system. When the illumination falls below the lower predetermined value, the signal voltage applied to control electrode 118 is insufficient to maintain oscillations in the multivibrator 14 and the control relay 16 is energized causing the power relay to switch the headlamp system to the upper beam.

Although the description of this invention has been given with reference to particular embodiments, it is not to be construed in a limiting sense. Many variations and modifications within the spirit and scope of the invention will now occur to those skilled in the art. For a definition of the invention, reference is made to the appended claims.

We claim:

1. A control circuit comprising condition responsive means for developing a signal voltage indicative of a predetermined value of a condition, an oscillator housing a pair of input circuits and an output circuit, a current responsive relay in the output circuit, means for applying a steady supply voltage across the output circuit to cause a normal steady state current flow through the relay, circuit means for applying the signal voltage to one oscillator input circuit to initiate oscillations in the output circuit, circuit means responsive to the oscillatory current flow in the output circuit for developing a control voltage, means for applying the control voltage to the other oscillator input circuit for modifying the steady state current conduction in the output circuit to effect operation of said relay.

2. A control circuit comprising condition responsive means for developing a signal voltage indicative of the value of a condition, an oscillator of the free running type including a pair of amplifying devices each having an input circuit and an output circuit with the input circuit of each connected with the output circuit of the other to maintain sustained oscillations in the output circuits, means for applying the signal voltage to the input circuit of one amplifying device to initiate oscillations upon the occurrence of a predetermined value of the condition, means responsive to oscillations in one of the output circuits for developing a control voltage, means for applying the control voltage to the input circuit of one amplifying device for varying the current conduction in the output circuit thereof, and a current responsive control relay in the output circuit of the last mentioned amplifying device.

3. A control circuit comprising condition responsive means for developing a signal voltage indicative of the value of a condition, a multivibrator of the free running type, means for applying the signal voltage to the first amplifying device of the multivibrator to initiate sustained oscillations therein upon the occurrence of a predetermined value of the condition, means responsive to the oscillations in said multivibrator for developing a control voltage, means for applying the control voltage to the second amplifying device of the multivibrator for changing the current conduction thereof, and a current responsive control relay connected to the second amplifying device.

4. A control circuit comprising condition responsive means for developing a signal voltage indicative of the value of a condition, an oscillator of the free running type including first and second multi-electrode amplifying devices each having an output circuit extending between current translating electrodes and an input circuit extending between control electrodes and one of the current translating electrodes, a time constant circuit coupling the input circuit of each device to the output circuit of the other device whereby sustained oscillations may be developed in the output circuits, means for applying a bias voltage to a control electrode of the second device to maintain current in the output circuit thereof, a control relay having an energizing winding serially connected in the output circuit of the second device and being normally energized by the current, means for applying the signal voltage to a control electrode of the first device to render it conductive upon the occurrence of a predetermined value of the condition and to initiate oscillations in said output circuits, and a negative clamping circuit coupling the output circuit of one of the devices to a control electrode of the second device to decrease the current in the winding of the control relay in response to said oscillations, whereby the winding of the control relay is de-energized upon the occurrence of the predetermined value of the condition.

5. A circuit for automatically controlling the headlights of an automotive vehicle comprising light responsive means adapted to develop a signal voltage in response to a predetermined value of illumination, a multivibrator of the free-running type, bias means for maintaining one of the multivibrator amplifying devices normally conductive, means for applying the signal voltage to the other amplifying device of the multivibrator to initiate sustained oscillations therein, means responsive to the oscillations in the multivibrator for developing a control voltage, means for applying the control voltage to the said other amplifying device of the multivibrator for decreasing the current conduction thereof, and a current responsive control relay in circuit with the said other amplifying device.

6. A circuit for automatically controlling the headlights of an automotive vehicle comprising a voltage source, a resistor connected across the voltage source, a photo-conductive cell adapted to vary the current flow through the resistor in response to variations of illumination, a multivibrator of the free-running type having a first amplifying device biased to a nonconductive state and a second amplifying device biased to a conductive state, circuit means for applying the voltage developed across the resistor to the first amplifying device to render the device conductive and to initiate oscillations in the multivibrator upon the occurrence of a predetermined value of illumination, circuit means responsive to the oscillations in the multivibrator for developing a control voltage, means for applying the control voltage to the second amplifying device to reduce the current conduction thereof, and a current responsive control relay connected in circuit with the second amplifying device.

7. A circuit for automatically controlling the headlamps of an automotive vehicle comprising a series circuit including a photo-conductive cell and a resistor, means for applying a supply voltage of one value across said series circuit whereby a signal voltage is developed across said resistor which varies as a function of the illumination of said cell and the value of said supply voltage, relay means connected to said resistor and responsive to a signal voltage of predetermined value for switching the headlamp circuit from a first condition to a second condition upon the occurrence of one predetermined value of illumination, and circuit means actuated by the relay means for changing the supply voltage to a different value whereby the relay means is effective upon the occurrence of another predetermined value of illumination to switch the headlamp circuits from the second condition to the first condition.

8. A circuit for automatically controlling the headlamps of an automotive vehicle comprising a series circuit including a photo-conductive cell and resistor, means for applying a supply voltage across the series circuit for developing a signal voltage across said resistor which varies with the illumination of the cell, a multivibrator of the free-running type, means for applying the signal voltage to the first amplifying device of the multivibrator to initiate oscillations therein upon the occurrence of a predetermined value of illumination, means responsive to the oscillations in said multivibrator for developing a control voltage, means for applying the control voltage to the second amplifying device of the multivibrator for changing the current conduction therein, and a current responsive control relay connected to the second amplifying device.

9. A control circuit comprising condition responsive means for developing a signal voltage indicative of the value of a condition, an oscillator of the free-running type including a pair of amplifying devices each having an input circuit and an output circuit with the input circuit of each coupled with the output circuit of the other through time constant circuits to maintain sustained oscillations in the output circuits, means for applying the signal voltage to the input circuit of one amplifying device to initiate oscillations upon the occurrence of a predetermined value of the condition, a serially connected condenser and rectifier connected across the output circuit of one of the amplifying devices, a resistor connected across the rectifier whereby a control voltage is developed across said resistor, means for applying the control voltage to the input circuit of one of said amplifying devices to change the current conduction thereof, and a current responsive control relay connected in the output circuit of the last mentioned amplifying device.

10. In combination with a multivibrator of the free-running type having one amplifying device normally conductive and the other amplifying device normally nonconductive, a current responsive control relay connected in the output circuit of one of said devices, and a clamping circuit interconnecting the output circuit and input circuit of said one of the devices whereby current conduction thereof is changed in response to oscillations in said output circuits.

References Cited in the file of this patent

UNITED STATES PATENTS

| | | |
|---|---|---|
| 1,917,245 | Edwards et al. | July 11, 1933 |
| 2,100,755 | Shepard | Nov. 30, 1937 |
| 2,682,624 | Atkins | June 29, 1954 |